Oct. 8, 1957

K. E. JAMES ET AL 2,809,270

MACHINE FOR WELDING REINFORCEMENTS
FOR CONCRETE PIPES AND THE LIKE

Filed Dec. 31, 1954

KENNETH E. JAMES,
ALFRED DAHLSTRUM,
INVENTORS.

BY *Hazard & Miller*

ATTORNEYS.

KENNETH E. JAMES,
ALFRED DAHLSTRUM,
INVENTORS.

BY Hazard & Miller

ATTORNEYS.

Oct. 8, 1957

K. E. JAMES ET AL 2,809,270

MACHINE FOR WELDING REINFORCEMENTS
FOR CONCRETE PIPES AND THE LIKE

Filed Dec. 31, 1954

KENNETH E. JAMES,
ALFRED DAHLSTRUM,
INVENTORS.

BY Hazard & Miller

ATTORNEYS.

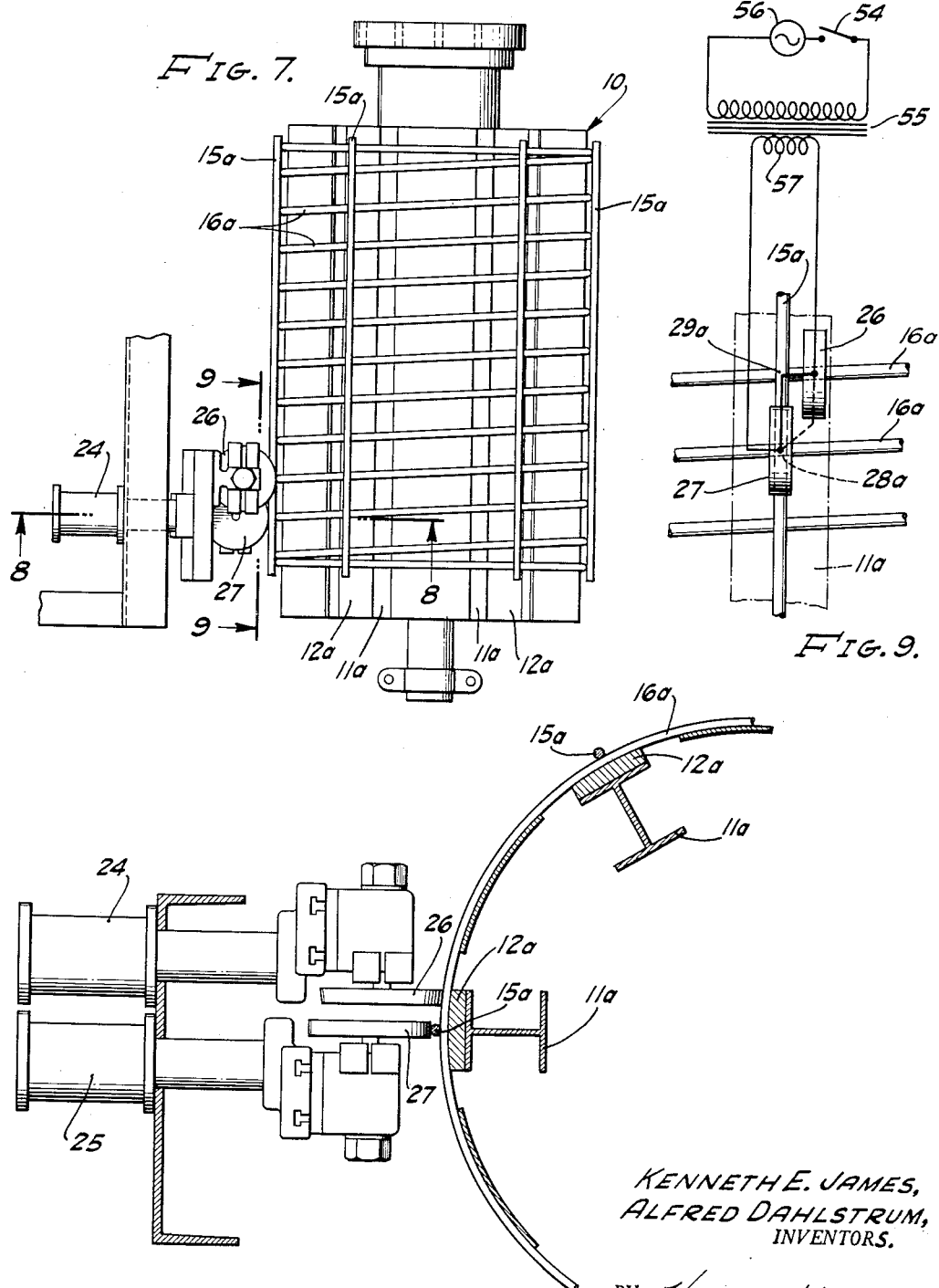

United States Patent Office 2,809,270
Patented Oct. 8, 1957

2,809,270

MACHINE FOR WELDING REINFORCEMENTS FOR CONCRETE PIPES AND THE LIKE

Kenneth E. James and Alfred Dahlstrum, Baldwin Park, Calif., assignors to United Concrete Pipe Corporation, Baldwin Park, Calif., a corporation of California Application December 31, 1954, Serial No. 479,157

8 Claims. (Cl. 219—56)

This invention relates to a machine for welding reinforcements for concrete pipes and the like and similar structures wherein the longitudinal wires are traversed by circumferentially extending wires and are welded thereto at the crossings.

In electrically welding longitudinal and circumferential wires together by resistance-type welding, it is highly desirable to anneal the weld after it has been produced. It is, therefore, a more specific object of the present invention to provide a machine wherein the crossings between longitudinal and circumferential wires will first be resistance-welded together and thereafter in the course of forming a succeeding weld at another crossing between longitudinal and circumferential wires, at least a portion of the electric current between the electrodes will be caused to pass or flow through the weld previously formed. In this manner, after the weld has been initially formed it will either be reheated or kept hot for a sufficient length of time so that an annealing effect can be accomplished.

Another object of the invention is to provide a machine of this character consisting essentially of a rotary mandrel on which longitudinal wires may be positioned which are traversed by circumferentially extending wires. Adjacent the mandrel there is a carriage which is movable in a direction substantially parallel to the longitudinal wires. This carriage carries electrodes, one of which, when it is over a crossing between circumferential and longitudinal wires, will be "fired" to produce a resistance-type weld at the crossing. Machines of this general character have heretofore been devised but have attempted to govern the "firing" by the traversing of a circumferential wire by one of the electrodes. An objection to such a machine is that the timing of the "firing" is rather difficult to establish and to maintain. It is desirable of course that the firing take place while an electrode is directly over a crossing.

An object of the present invention is to provide an improved mechanism for "firing" the electrode at the crossing which can be varied to accommodate reinforcements wherein the circumferential wires are spaced different distances from each other and which can also be manually adjusted even while the machine is in operation to cause the "firing" to take place when the electrode is directly over the crossing.

With the foregoing and other objects in view, which will be made manifest in the following detailed description and specifically pointed out in the appended claims, reference is had to the accompanying drawings for an illustrative embodiment of the invention, wherein:

Fig. 7 is a view similar to Fig. 4 but illustrating an alternative form of construction wherein longitudinal wires are applied to the exterior of the circumferential wires;

Fig. 8 is a sectional view taken substantially upon the line 8—8 upon Fig. 7; and Fig. 9 is a sectional view taken substantially upon the line 9—9 upon Fig. 7.

Figure 1:
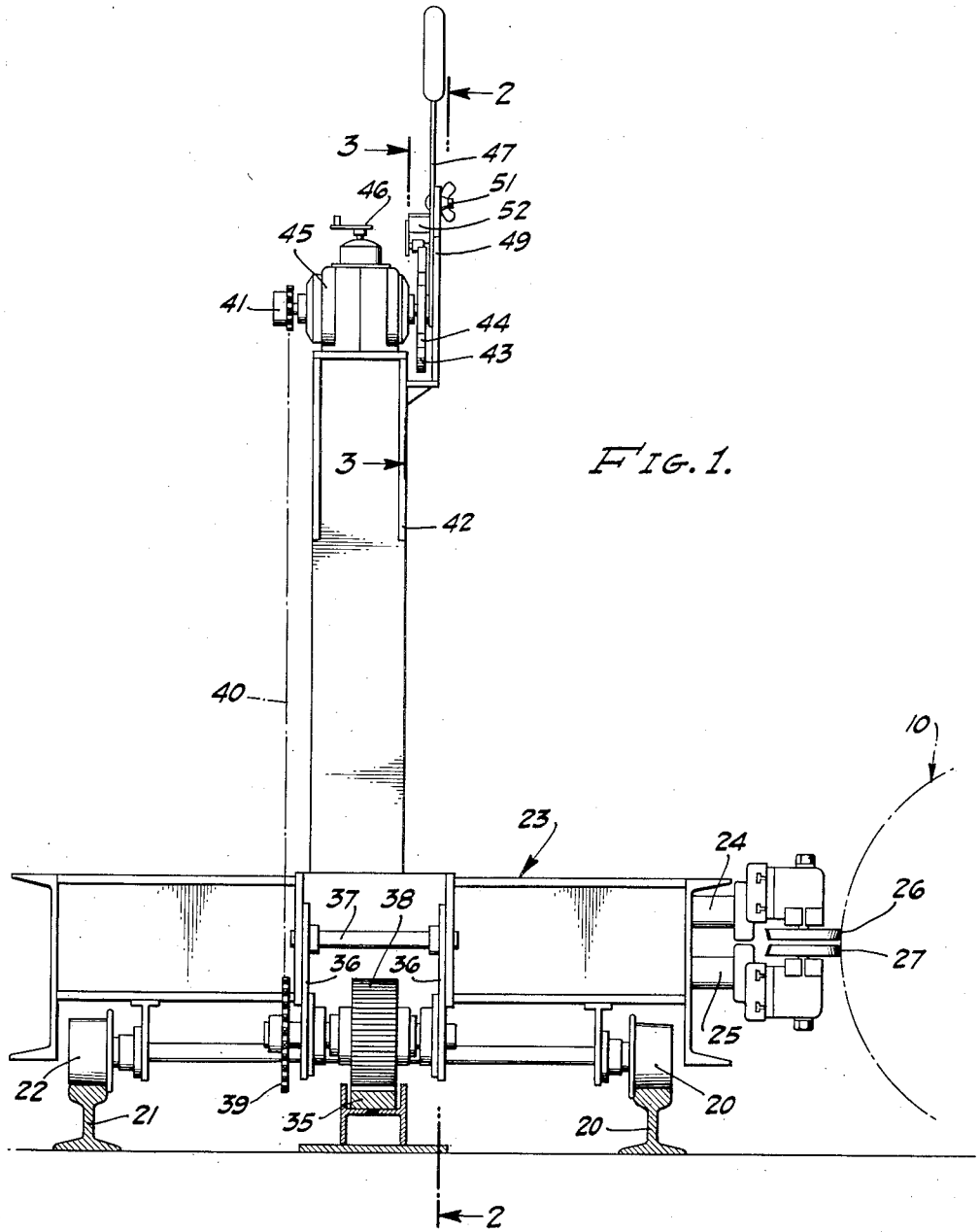
Figure 1 is an end view of the carriage embodying the present invention.
Figure 3:
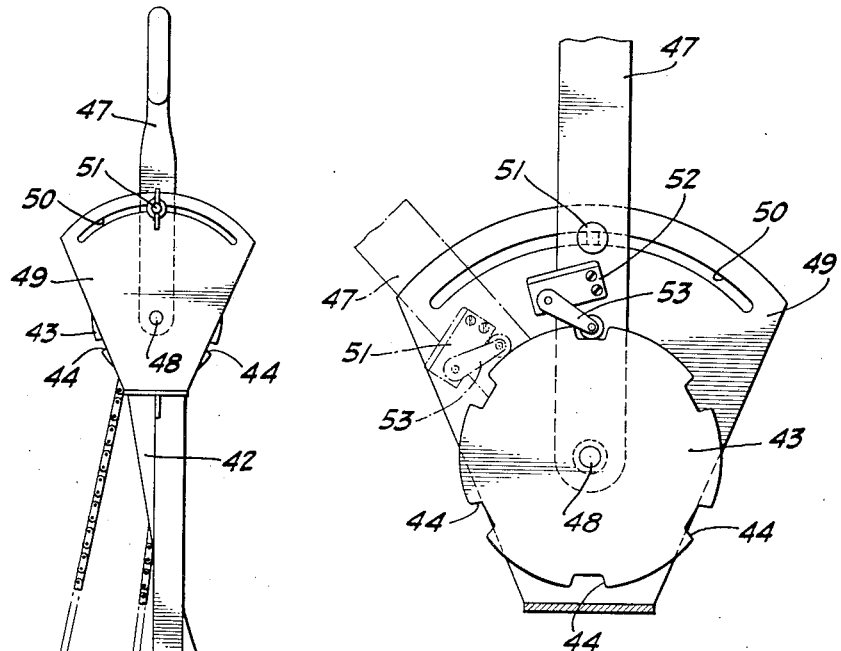
Fig. 3 is a partial view in vertical section taken substantially upon the line 3—3 upon Fig. 1.
Figure 2:
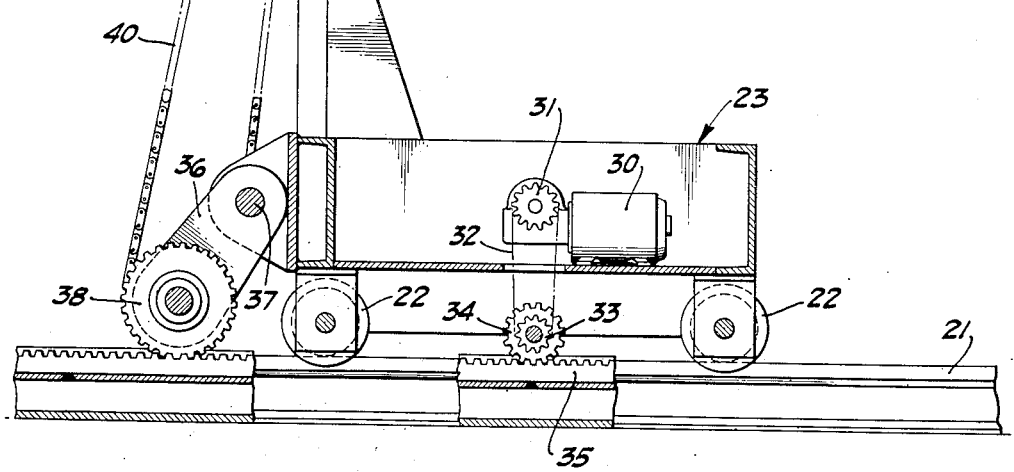
Fig. 2 is a sectional view taken substantially upon the line 2—2 upon Fig. 1.

Referring to the accompanying drawings wherein similar reference characters designate similar parts throughout, the improved machine consists of a mandrel generally indicated at 10 that is rotatably supported at its ends for rotation about its longitudinal central axis. This mandrel may be largely composed of longitudinally extending I-beams 11 which in the form shown in Figs. 4 and 5, have copper ground strips 12 mounted on their outer sides and on which insulation strips 13 are mounted. The insulation strips and the copper ground strips co-operate to form longitudinally extending grooves 14 designed to receive longitudinal bars or wires 15. When these longitudinal wires are in position in their respective grooves 14 a circumferentially extending rod or wire 16 is helically wound about the mandrel in traversing relationship to the longitudinal wires. Thus, wherever the helical wire 16 crosses a longitudinal wire 15 there will be a crossing, and it is desired to not only weld the circumferential wire to the longitudinal wires at these crossings, but also to anneal the weld at these crossings.

The construction shown in Figs. 7 and 8 is substantially the same as that previously described except that the outer faces of the I-beams 11a are equipped with copper ground strips 12a which extend thereacross. In this instance, the circumferential wires or helical wires 16a are first wound on the mandrel in a helical manner and the longitudinal wires 15a are positioned against the outer sides of the convolutions of the helical wire.

Figure 4:
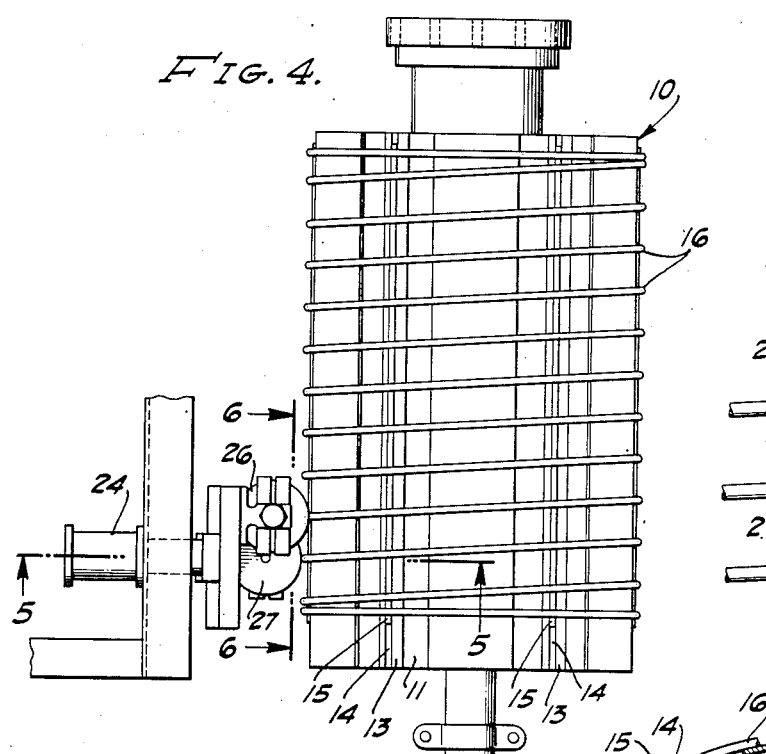
Fig. 4 is a top plan view of a portion of the machine and illustrating a portion of the carriage that is used in conjunction therewith.
Figure 6:
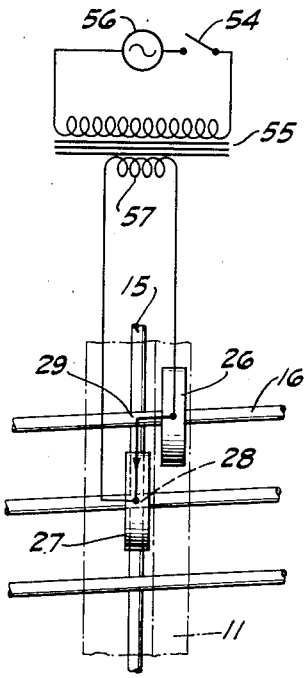
Fig. 6 is a partial view in vertical section taken substantially upon the line 6—6 upon Fig. 4.
Figure 5:
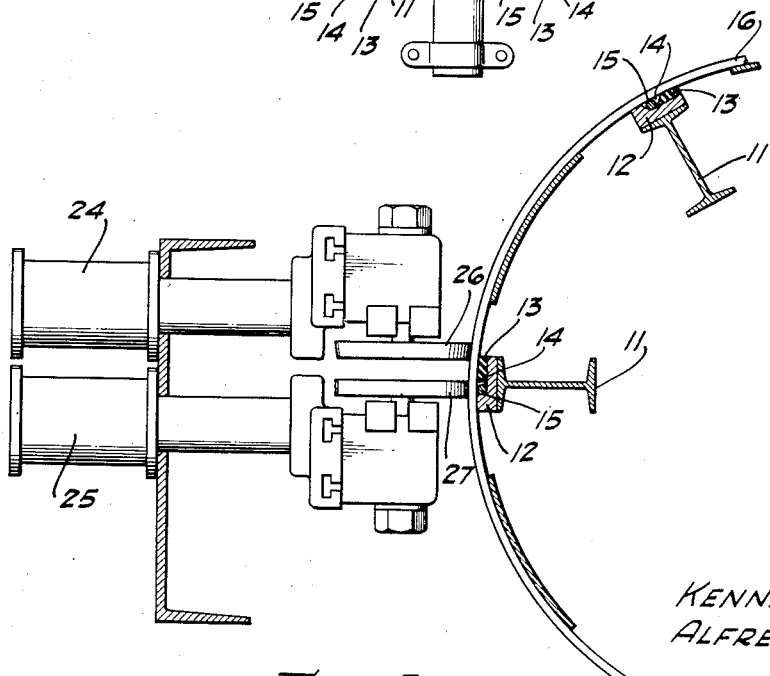
Fig. 5 is an enlarged partial vertical section taken substantially upon the line 5—5 upon Fig. 4.

After the helical wire and the longitudinal wires have been mutually assembled together on the mandrel with the longitudinal wires either on the inside of the circumferential wires, as in Figs. 4 and 5, or with the longitudinal wires 15a disposed on the exterior of the circumferential wires as disclosed in Figs. 7 and 8, it is desirable to weld and to anneal the crossings between these wires. To this end, adjacent the mandrel and in substantial parallelism with the longitudinal central axis thereof there are rails 20 and 21 on which roll the wheels 22 of a carriage 23. This carriage serves to carry pneumatic rams 24 and 25 on which are rotatably mounted roller electrodes 26 and 27. The supports for these roller electrodes are adjustable on the rams so that the lower electrode 27 may be arranged to follow or trace a longitudinal wire and to press circumferential wire convolutions firmly thereagainst at each crossing. The upper electrode 26 is arranged in trailing relationship to the lower electrode 27, that is, when the electrode 27 is at a crossing indicated at 28 on Fig. 6, the upper electrode 26 is traversing a succeeding circumferential wire convolution. This electrode is also arranged in spaced relation to the crossing 29, see Fig. 6, which was previously traversed by the electrode 27. With this arrangement, at the time of "firing" or energizing the two electrodes the path of current flow may be regarded as from the electrode 26 along the circumferential wire convolutions to the crossing 29, through the crossing to the longitudinal wire 15, along the length of the longitudinal wire to the crossing 28 and up through the crossing to the electrode 27.

During this flow of current, which is of low voltage but high amperage a resistance weld takes place between the circumferential wire and the longitudinal wire at the crossing 28. The crossing 29 which was previously welded, has current passing therethrough which serves either to reheat the resistance weld at the crossing 29 or to maintain this weld in a heated condition so that an annealing effect is produced following the actual completion of the weld beneath the electrode 27.

When the longitudinal wires are arranged externally of the circumferential wires, as illustrated in Figs. 7 and 8, the arrangement of the electrodes is the same, but in this instance, as illustrated in Fig. 9, the path of current may be regarded as being divided. Thus, from the upper electrode 26 the major portion of the current will flow through the circumferential wire to the copper backup strip 12a and through this backup strip to the convolution of the circumferential wire which is beneath the electrode 27. It then flows up through the crossing 28a to the electrode 27. Not all of the current flows in this direction, however, and some of the current flows from the electrode 26 along the circumferential wire to the crossing 29a and then along the longitudinal wire 15a to the crossing 28a. That portion of the current that flows along this path has a similar heating effect upon the weld at 29a and consequently annealing of the previously formed weld at this crossing is obtainable.

The carriage is caused to travel or be propelled along the rails 20 and 21 by a power drive, such as an electric motor 30 which drives a sprocket 31, a chain 32, and a sprocket 33 which is rigid with a gear 34 that meshes with a rack 35 arranged centrally between the rails. On the carriage there is a pivoted link or arm 36 that is pivoted at 37 and which carries a gear 38 that meshes with the rack 35. In association with the gear 38 there is a sprocket 39 which drives a chain 40 that is trained over a sprocket 41 that is rotatably mounted on a standard 42. The sprocket 41 drives a circular cam 43 in which notches 44 are formed. Between the sprocket 41 and the cam 43 there is a speed-change transmission 45 that can be manually adjusted by means of a crank or handle 46. With this arrangement, gear 38 is rotated at a speed proportional to the speed of travel of the carriage along the rails 20 and 21. By adjusting the speed-change transmission 45 the cam 43 can be caused to rotate at a speed proportional to the speed of travel of the carriage and to be so rotated that one notch 44 will be uppermost at the time each crossing 28 or 28a is traversed by the electrode 27. If the spacing between adjacent convolutions of the helical wire is increased the speed-change transmission 45 is adjusted to slow down the speed of rotation of the cam 43. Conversely, if the spacing between adjacent convolutions of the helical wire is shortened, then the speed-change transmission is adjusted so that the speed of rotation of the cam 43 is increased. In this manner, there will be one notch 44 uppermost whenever a crossing 28 or 28a is traversed, or at least in timed relation thereto.

A lever 47 is mounted as at 48 for swinging movement about the axis of rotation of the cam 43. This lever traverses a quadrant 49 and has a stud extending through a slot 50 therein. A wing nut on the stud indicated at 51 can be tightened to hold the lever 47 in any adjusted position. This lever carries a switch 52 which is equipped with a follower 53 that rides on the periphery of the cam 43 and which is adapted to drop into a notch 44 whenever a notch is opposite the follower. This switch may either be the switch 54 which controls the primary circuit of the transformer 55 that includes the generator 56, or it may be merely a relay switch that controls an exciting circuit which actuates the switch 54. At all events, when the follower 53 drops into a notch 44 switch 54 is closed, thus completing the primary circuit and causing the secondary 57 of the transformer to be energized. The secondary circuit includes the two electrodes 26 and 27.

It is obvious from the above-described construction that one notch 44 on the cam 43 will be turned uppermost beneath the follower 53 for each of the circumferential convolutions that are traversed. If the "firing" of the electrodes occurs slightly in advance of the intersection 28 or 28a this can be instantly and manually corrected by loosening the wing nut 51 and adjusting the lever 47 to a more retarded position. On the other hand, if the "firing" of the electrodes occurs slightly after the intersection 28 has been traversed by the electrode 27, the lever 47 is adjusted into a more advanced position. In this manner, it is possible to cause the "firing" to take place at the exact instant of time desired to produce a proper or satisfactory resistance-type weld at the intersection 28. Once that the timing relationship has been established it will be maintained as long as the spacing between adjacent convolutions remains the same. However, as previously explained, if the spacing between adjacent convolutions varies this may be adjusted for or compensated for by adjusting the speed-change transmission 45.

From the above-described constructions it will be appreciated that an improved machine for welding cagelike reinforcements for concrete pipes and similar structures wherein provision has been made for causing at least some of the current to pass through the weld after the weld has been completed for the purpose of annealing it. Furthermore, the "firing" of the electrodes is in a manner that is entirely independent of their engagement with wires of the cage. If the wires should be quite heavy and it is desired to "fire" the electrodes slightly in advance of the crossing 28 or 28a as the case may be, this can be readily accomplished by merely adjusting the lever 47.

Various changes may be made in the details of construction without departing from the spirit and scope of the invention as defined by the appended claims.

We claim:

1. In a machine for welding longitudinal and circumferential wires together wherein the longitudinal wires are on the outside of the circumferential wires, a first welding electrode arranged to traverse crossings between longitudinal wires and circumferential wires successively in a direction parallel to the longitudinal wires and a second electrode arranged to traverse circumferential wires in trailing relationship to the first electrode and in a direction parallel to the longitudinal wires whereby the path of current flow of at least part of the current flowing between the electrodes will be through a crossing previously traversed by the first electrode to anneal the weld formed at the crossing.

2. In a machine for welding longitudinal wires to circumferential wires, means for supporting said wires, a carriage arranged to move substantially parallel to the longitudinal wires, at least one electrode carried by the carriage arranged to traverse crossings between longitudinal and circumferential wires in a direction parallel to the longitudinal wires, a cam, means for rotating the cam in proportion to the speed of travel of the carriage, and means operable by the cam for causing the electrodes to fire when one electrode is over a crossing.

3. In a machine for welding longitudinal wires to circumferential wires, means for supporting said wires, a carriage arranged to move substantially parallel to the longitudinal wires, at least one electrode carried by the carriage arranged to traverse crossings between longitudinal and circumferential wires in a direction parallel to the longitudinal wires, a cam, means for rotating the cam in proportion to the speed of travel of the carriage, and means operable by the cam for causing the electrodes to fire when one electrode is over a crossing, said means being adjustable to vary the speed of rotation of the cam in accordance with the spacing between adjacent convolutions of the circumferential wires.

4. In a machine for welding longitudinal wires to circumferential wires, means for supporting said wires, a carriage arranged to move substantially parallel to the longitudinal wires, at least one electrode carried by the carriage arranged to traverse crossings between longitudinal and circumferential wires in a direction parallel to the longitudinal wires, a cam, means for rotating the cam in proportion to the speed of travel of the carriage, and means operable by the cam for causing the electrodes to fire when one electrode is over a crossing, said means being adjustable so as to vary the timing of the firing of the electrodes with relation to the approach of the mentioned electrode to a crossing.

5. In a machine for welding longitudinal bars to circumferential rods, a rotatable mandrel on which the longitudinal bars can be positioned parallel to the axis of rotation of the mandrel and on which the circumferential rods can be positioned circumferentially, roller electrodes movable in a direction parallel to the axis of the mandrel and rotatable about axes at right angles to said axis, one roller electrode being arranged in trailing relation to the other, the lead roller electrode being arranged to traverse crossings of the longitudinal bars and the circumferential rods to weld them together, and the trailing roller electrode being arranged to traverse the circumferential rods at points spaced from a crossing previously traversed by the lead roller electrode whereby at least a portion of current flowing between the electrodes will be caused to flow through a crossing previously traversed and welded by the lead roller electrode to anneal the previously traversed crossing.

6. In a machine for welding longitudinal bars to circumferential rods, a rotatable mandrel on which the longitudinal bars can be positioned parallel to the axis of rotation of the mandrel and on which the circumferential rods can be positioned circumferentially, roller electrodes movable in a direction parallel to the axis of the mandrel and rotatable about axes at right angles to said axis, means for urging the roller electrodes toward the mandrel, one roller electrode being arranged in trailing relation to the other, the lead roller electrode being arranged to traverse crossings of the longitudinal bars and the circumferential rods to weld them together, the trailing roller electrode being arranged to traverse circumferential rods spaced from a crossing previously traversed by the lead roller electrode whereby at least a portion of current flowing between the electrodes will be caused to flow through a crossing previously traversed and welded by the lead roller electrode to anneal the previously traversed crossing, and means for supplying electric current to said electrodes.

7. In a machine for welding longitudinal bars to circumferential rods, a rotatable mandrel, longitudinally extending supporting bars on the mandrel having recesses adapted to receive the longitudinal bars and hold them positioned parallel to the axis of rotation of the mandrel, one side of each recess being formed of insulating material, said supporting bars being adapted to also support the circumferential rods over the longitudinal bars, roller electrodes movable in the direction parallel to the axis of the mandrel and rotatable about axes at right angles to said axis, means for urging the roller electrodes toward the mandrel, one roller electrode being arranged in trailing relation to the other, the lead roller electrode being arranged to traverse crossings of the circumferential rods and the longitudinal bars to weld them together and the trailing roller electrode being arranged to traverse the circumferential rods at points spaced from a crossing previously traversed by the lead roller electrode and over the insulating material whereby at least a portion of current flowing between the electrodes will be caused to flow through a crossing previously traversed and welded by the lead roller electrode to anneal the previously traversed crossing.

8. In a machine for welding longitudinal bars to circumferential rods, a rotatable mandrel, supporting bars extending longitudinally of the mandrel and on which the circumferential rods may be positioned and over which the longitudinal bars may be positioned parallel to the axis of rotation of the mandrel, roller electrodes movable in a direction parallel to the axis of the mandrel and rotatable about axes at right angles to said axis, means for urging the electrodes toward the mandrel, one roller electrode being arranged in trailing relation to the other, the lead roller electrode being arranged to roll against a longitudinal bar and to traverse crossings of the longitudinal bars and the circumferential rods to weld them together, the trailing roller electrode being arranged to traverse circumferential rods at points spaced from crossings previously traversed by the lead roller electrode whereby at least a portion of current flowing between the electrodes will be caused to flow through a crossing previously traversed and welded by the lead roller electrode to anneal the previously traversed crossing, and means for energizing said electrodes.

References Cited in the file of this patent

UNITED STATES PATENTS

| 1,878,760 | Cosgrove et al. | Sept. 20, 1932 |
| 2,473,859 | Butler | June 21, 1949 |

FOREIGN PATENTS

| 1139/31 | Australia | Mar. 8, 1932 |
| 581,221 | Great Britain | Oct. 4, 1946 |
| 681,867 | Great Britain | Oct. 29, 1952 |